(12) United States Patent
Pero

(10) Patent No.: US 8,662,417 B2
(45) Date of Patent: Mar. 4, 2014

(54) GAS TURBINE ENGINE FAN VARIABLE AREA NOZZLE WITH SWIVABLE INSERT SYSTEM

(71) Applicant: United Technologies Corporation, Hartford, CT (US)

(72) Inventor: Edward B. Pero, Somers, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 13/625,343

(22) Filed: Sep. 24, 2012

(65) Prior Publication Data

US 2013/0047579 A1 Feb. 28, 2013

Related U.S. Application Data

(63) Continuation of application No. 12/441,607, filed as application No. PCT/US2006/040249 on Oct. 12, 2006, now Pat. No. 8,272,202.

(51) Int. Cl.
*F02K 1/06* (2006.01)

(52) U.S. Cl.
USPC .................. 239/265.19; 60/226.1; 60/771

(58) Field of Classification Search
USPC ......... 60/204, 226.1, 226.3, 771; 239/265.19, 239/265.25, 265.27
See application file for complete search history.

(56) References Cited

U.S. PATENT DOCUMENTS

| | | | | |
|---|---|---|---|---|
| 2,663,144 A | * | 12/1953 | Nordstrom et al. | ......... 60/39.181 |
| 3,477,230 A | | 11/1969 | Bauger et al. | |
| 3,598,318 A | * | 8/1971 | Schiel | ...................... 239/265.13 |
| 3,877,663 A | | 4/1975 | Curran et al. | |
| 3,967,443 A | | 7/1976 | McMurtry | |

(Continued)

FOREIGN PATENT DOCUMENTS

| | | |
|---|---|---|
| EP | 1191214 A2 | 3/2002 |
| GB | 2372729 | 9/2002 |

OTHER PUBLICATIONS

Hall, Cesare and Crichton, Daniel, Engine and Installation Configurations for a Silent Aircraft, American Institute of Aeronautics and Astronautics, Inc., ISABE-2005-1164, 2005, pp. 1-12.*

(Continued)

*Primary Examiner* — Ehud Gartenberg
*Assistant Examiner* — Lorne Meade
(74) *Attorney, Agent, or Firm* — Carlson, Gaskey & Olds, P.C.

(57) ABSTRACT

An example nacelle assembly for a gas turbine engine includes a nacelle defined about an axis and defining a boundary of a fan bypass flow path. A fan variable area nozzle includes a plurality of inserts movably mounted to said nacelle. Each of the multiple of inserts is located at a circumferential position about the nacelle. The multiple of inserts are each independently moveable into the fan bypass flow path relative the nacelle to selectively vary a fan nozzle exit area.

16 Claims, 2 Drawing Sheets

(56) References Cited

U.S. PATENT DOCUMENTS

| | | | |
|---|---|---|---|
| 4,251,987 A | | 2/1981 | Adamson |
| 4,782,658 A | * | 11/1988 | Perry .......................... 60/226.1 |
| 5,054,285 A | | 10/1991 | Geidel et al. |
| 5,782,431 A | | 7/1998 | Gal-Or et al. |
| 5,833,140 A | * | 11/1998 | Loffredo et al. ......... 239/265.37 |
| 6,183,388 B1 | * | 2/2001 | Hawkins ....................... 475/336 |
| 8,272,202 B2 | * | 9/2012 | Pero ................................ 60/204 |
| 2004/0187476 A1 | | 9/2004 | Lair |
| 2005/0241292 A1 | * | 11/2005 | Taylor et al. ................. 60/226.1 |
| 2010/0043394 A1 | * | 2/2010 | Pero .............................. 60/226.3 |

OTHER PUBLICATIONS

Search Report and Written Opinion mailed on Oct. 25, 2007 for PCT/US2006/040249.

Notification of Transmittal of the International Preliminary Report on Patentability mailed on Dec. 19, 2008 for PCT/US2006/040249.

\* cited by examiner

GAS TURBINE ENGINE FAN VARIABLE AREA NOZZLE WITH SWIVABLE INSERT SYSTEM

This application is a continuation of U.S. application Ser. No. 12/441,607 (now U.S. Pat. No. 8,272,202) filed on Mar. 17, 2009, which is a National Phase Application of PCT Application No. PCT/US2006/040249 filed on Oct. 12, 2006.

BACKGROUND

The present disclosure relates to a gas turbine engine, and more particularly to a turbofan engine having an insert system which swivels relative a fan bypass flow to vary the effective area of a fan nozzle exit area.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases discharged through the core exhaust nozzle.

The fan nozzles of conventional gas turbine engines have fixed geometry. The fixed geometry fan nozzles must be suitable for take-off and landing conditions as well as for cruise conditions. However, the requirements for take-off and landing conditions are different from requirements for the cruise condition. Optimum performance of the engine may be achieved during different flight conditions of an aircraft by tailoring the fan exhaust nozzle for the specific flight regimes.

Accordingly, it is desirable to provide an effective, lightweight fan variable area nozzle for a gas turbine engine.

SUMMARY

An example nacelle assembly for a gas turbine engine includes a nacelle defined about an axis and defining a boundary of a fan bypass flow path. A fan variable area nozzle includes a plurality of inserts movably mounted to said nacelle. Each of the plurality of inserts is located at a circumferential position about the nacelle. The plurality of inserts are each independently moveable into the fan bypass flow path relative to the nacelle to selectively vary a fan nozzle exit area.

In a further non-limiting embodiment according to the previous assembly, the nacelle is a core nacelle. A fan nacelle is mounted at least partially around said core nacelle and defines an outer boundary of the fan bypass flow path.

In a further non-limiting embodiment according to any of the previous assemblies, includes a controller in communication with the fan variable area nozzle to independently position each of said plurality of inserts in response to a flight condition.

In a further non-limiting embodiment according to any of the previous assemblies, the plurality of inserts are configured to be asymmetrically deployed relative to one another to vector a fan thrust.

In a further non-limiting embodiment according to any of the previous assemblies, the plurality of inserts are operable to provide at least an approximately 20% (twenty percent) effective change in the fan nozzle exit area.

In a further non-limiting embodiment according to any of the previous assemblies, the plurality of inserts are arranged to move axially aft to reach a deployed position.

In a further non-limiting embodiment according to any of the previous assemblies, the plurality of inserts move axisymmetrically such that the plurality of inserts move uniformly.

An example nacelle assembly for a gas turbine engine includes a nacelle defined about an axis and defining a boundary of a fan bypass flow path. A fan variable area nozzle includes a plurality of inserts movably mounted to the nacelle. Each of the plurality of inserts is disposed in the nacelle and extend therefrom. The plurality of inserts are each independently moveable into the fan bypass flow path relative the nacelle to selectively vary a fan nozzle exit area.

In a further non-limiting embodiment according to previous assembly, the nacelle is a core nacelle. A fan nacelle is mounted at least partially around the core nacelle and defines an outer boundary of the fan bypass flow path.

In a further non-limiting embodiment according to any of the previous assemblies, includes a controller in communication with the fan variable area nozzle to independently position each of the plurality of inserts in response to a flight condition.

In a further non-limiting embodiment according to any of the previous assemblies, at least one the plurality of inserts are configured to be asymmetrically deployed relative another of the plurality of inserts to vector a fan thrust.

In a further non-limiting embodiment according to any of the previous assemblies, the plurality of inserts are operable to provide at least an approximately 20% (twenty percent) effective change in the fan nozzle exit area.

In a further non-limiting embodiment according to any of the previous assemblies, the plurality of inserts are arranged to move axially aft to reach a deployed position.

In a further non-limiting embodiment according to any of the previous assemblies, the plurality of inserts move axisymmetrically such that the plurality of inserts move uniformly.

An example gas turbine engine includes a core engine defined about an axis. The core engine includes a low pressure turbine having a pressure ratio that is greater than 5. A turbofan is driven about the axis. A gear system is driven by the core engine. A nacelle is defined at least partially about the core engine to define a boundary of a fan bypass flow path. A plurality of inserts are movably mounted to the nacelle. Each of said plurality of inserts is located at a circumferential position about the nacelle. The plurality of inserts are each independently moveable into the fan bypass flow path relative the nacelle to selectively vary a fan nozzle exit area.

In a further non-limiting embodiment according to the previous engine, the nacelle is a core nacelle. A fan nacelle is mounted at least partially around the core nacelle to define the fan bypass flow path.

In a further non-limiting embodiment according to any of the previous engines, the turbofan is driven by the gear system about the axis. The gear system defines a gear reduction ratio of greater than or equal to 2.5.

BRIEF DESCRIPTION OF THE DRAWINGS

The various features and advantages of this disclosure will become apparent to those skilled in the art from the following detailed description of the currently preferred embodiment. The drawings that accompany the detailed description can be briefly described as follows.

DETAILED DESCRIPTION

Figure 1A:
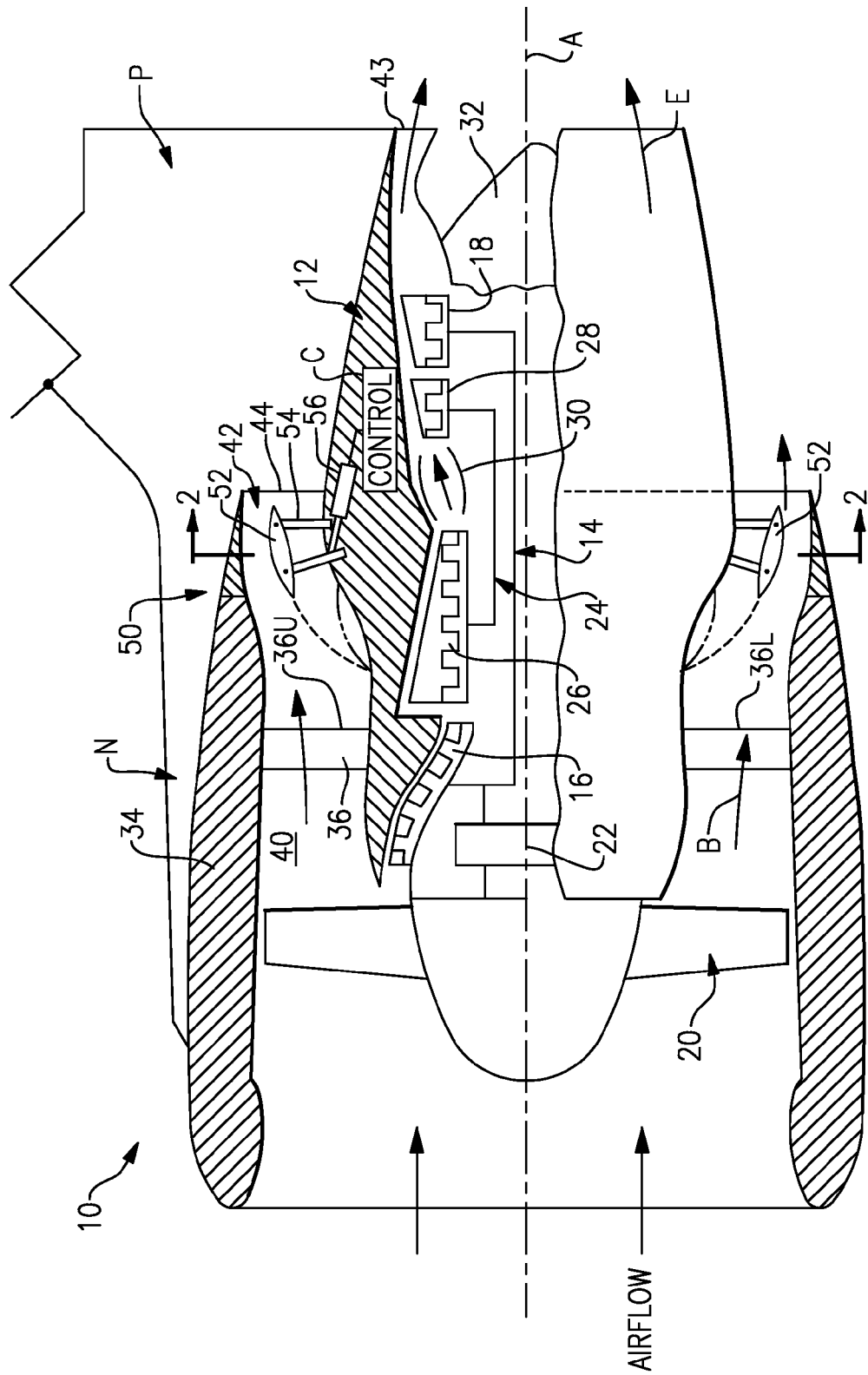
FIG. 1A is a general schematic partial fragmentary view of an exemplary gas turbine engine embodiment for use with the present disclosure.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the turbofan diameter is significantly larger than that of the low pressure compressor 16, and the low pressure turbine 18 has a pressure ratio that is greater than 5. The gear train 22 is preferably an epicycle gear train such as a planetary gear system or other gear system with a gear reduction ratio of greater than 2.5. It should be understood, however, that the above parameters are only exemplary of a preferred geared turbofan engine and that the present disclosure is likewise applicable to other gas turbine engines.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by a pylon structure 36 often generically referred to as an upper bifurcation 36U and lower bifurcation 36L, however, other types of pylons at various radial locations may likewise be usable with the present disclosure.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular fan bypass flow path 40 and is discharged from the engine 10 through an annular fan nozzle 42 which defines a fan nozzle exit area 44 between the fan nacelle 34 and the core nacelle 12.

A significant amount of thrust is provided by the bypass flow B due to the high bypass ratio. Thrust is a function of density, velocity, and area. One or more of these parameters can be manipulated to vary the amount and direction of thrust provided by the bypass flow B. The fan section 20 of the engine 10 is preferably designed for a particular flight condition—typically cruise at 0.8 M and 35,000 feet. The fan section 20 includes fan blades which are designed at a particular fixed stagger angle for an efficient cruise condition. A fan variable area nozzle (FVAN) 50 within the bypass flow B operates to change the effective area thereof.

The FVAN 50 is operated to effectively vary the fan nozzle exit area 44 to adjust fan bypass air flow such that the angle of attack or incidence on the fan blade is maintained close to design incidence at other flight conditions such as landing and takeoff, thus enabling optimized engine operation over a range of flight condition with respect to performance and other operational parameters such as noise levels.

Figure 1B:
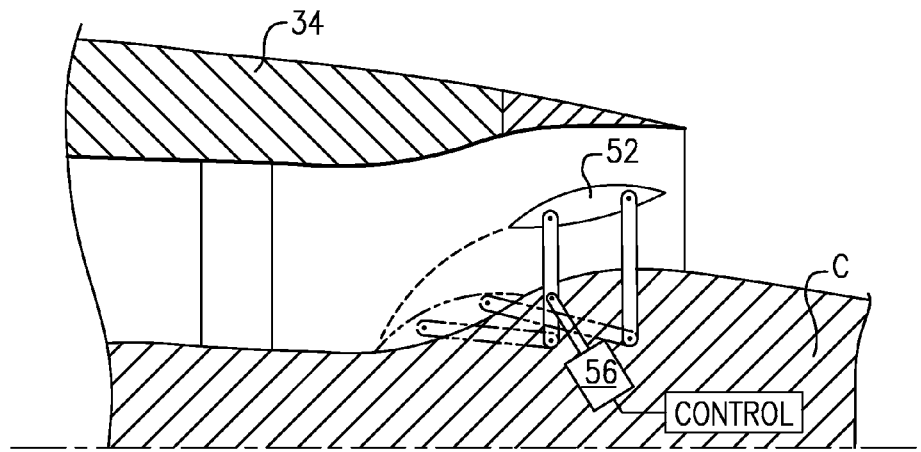
FIG. 1B is an expanded sectional view of the engine.
Figures 2A, 2B:
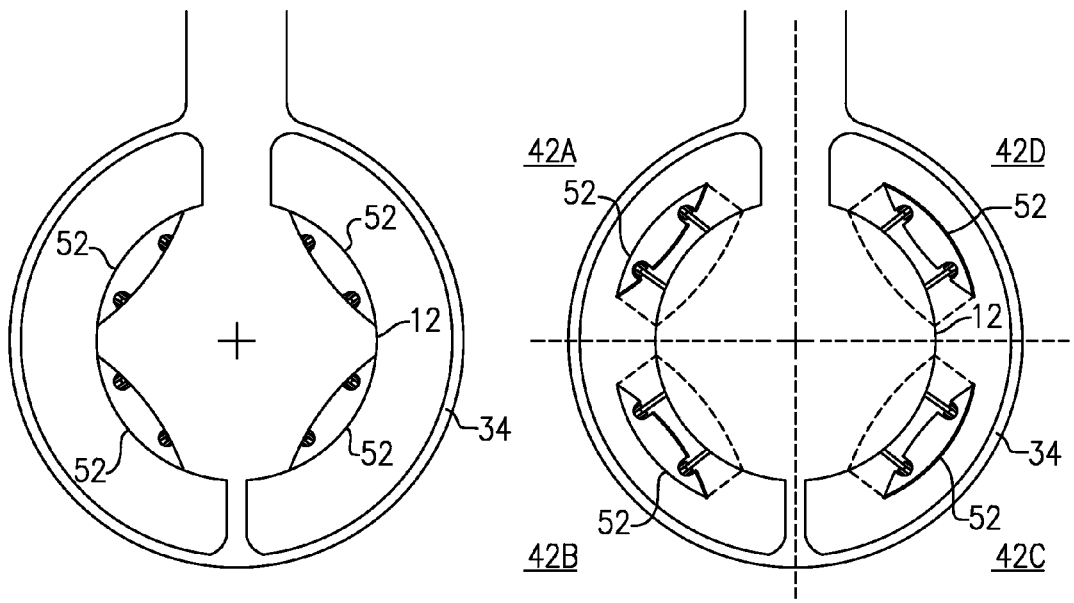
FIG. 2A is a sectional view of the engine of FIG. 1A through line 2-2 of the FVAN in a closed position.
FIG. 2B is a sectional view of the engine of FIG. 1A through line 2-2 of the FVAN in a thrust vectored position.

The bypass flow B through the nozzle exit area 44 is effectively altered through articulation of the FVAN 50. That is, articulation of the FVAN 50 effectively changes the physical area and geometry of the fan bypass flow path 40 to manipulate the area through which the bypass flow B must pass. The FVAN 50 generally includes a multitude of inserts 52, with an associated linkage 54 and an actuator system 56 (also shown in FIG. 1B). Each inserts 52 is movably mounted to the core nacelle 12 through the linkage 54 in response to the actuator system 56. Preferably, the inserts 52 are circumferentially located about the core nacelle 12 (FIG. 2A). Alternatively, the inserts 52 may be mounted to the core engine structure with cut-outs in the core nacelle 12 such that the inserts 52 extend therefrom. In other words, the inserts 52 may be located at various locations adjacent the bypass flow path so long as the inserts 52 may selectively be extended to effect the bypass flow.

The inserts 52 are preferably aerodynamically shaped members located upstream of the annular fan nozzle 42 between the fan nacelle 34 and the core nacelle 12. The linkage 54 of each insert 52 is preferably driven by the actuator system 56 to move the insert 52 between a fully extended and a fully stowed position. The inserts 52 are also shaped to interface with the core nacelle 12 to provide a flush aerodynamic surface when in the stowed position. The linkage 54 also preferably orients each insert 52 in response to the bypass flow B at each of a multiple of positions such as take-off/landing, climb and cruise.

The FVAN 50 preferably provides an approximately 20% (twenty percent) effective change in the fan nozzle exit area 44. That is, the FVAN 50 at the fully deployed position (cruise) takes up a maximum area within the fan bypass flow path 40 to effectively minimize the fan nozzle exit area 44. The FVAN 50 at the fully stowed position (takeoff/landing) takes up a minimum of area within the bypass flow path 40 to effectively maximize the fan nozzle exit area 44. It should be understood that an essentially infinite number of positions intermediate the fully deployed and fully stowed position may be utilized for other flight conditions such as climb or maneuvering. It should also be understood that other insert orientations as well as thrust vectored positions in which some circumferential insets 52 of the FVAN 50 are differentially positioned relative other circumferential inserts 52 (FIG. 2B) are likewise usable with the present disclosure.

In operation, the FVAN 50 communicates with the controller C to effectively vary the fan nozzle exit area 44 in response to movement of the inserts 52 within the fan bypass flow path 40. Other control systems including an engine controller flight control system may likewise be usable with the present disclosure.

By adjusting the inserts 52 axi-symmetrically such that all inserts are moved uniformly, thrust efficiency and fuel economy are maximized during each flight condition. By separately adjusting the circumferential inserts 52 within, for example, each sectors 42A-42D (FIG. 2B) to provide an asymmetrical fan nozzle exit area 44, engine fan bypass flow is selectively vectored to provide, for example only, trim balance or thrust controlled maneuvering, enhanced ground operations or short field performance.

The foregoing description is exemplary rather than defined by the limitations within. Many modifications and variations of the present disclosure are possible in light of the above teachings. The preferred embodiments of this disclosure have been disclosed, however, one of ordinary skill in the art would recognize that certain modifications would come within the scope of this disclosure. It is, therefore, to be understood that within the scope of the appended claims, the disclosure may be practiced otherwise than as specifically described. For that reason the following claims should be studied to determine the true scope and content of this invention.

What is claimed is:

1. A nacelle assembly for a gas turbine engine comprising:
   a nacelle defined about an axis and defining a boundary of a fan bypass flow path; and
   a fan variable area nozzle including a plurality of inserts movably mounted to said nacelle, each of said plurality of inserts located at a circumferential position about said nacelle, wherein said plurality of inserts are each independently moveable into the fan bypass flow path relative to said nacelle to selectively vary a fan nozzle exit area, wherein said plurality of inserts arranged in a stowed position define at least a portion of a radial inner boundary of the fan bypass flow path, wherein said plurality of inserts are moveable axially aft to reach a deployed position, wherein said plurality of inserts are axially forward of the aft end of the fan nozzle exit area, wherein said plurality of inserts in a deployed position bifurcate said fan bypass flow path into a radially inner flow path and a radially outer flow path.

2. The assembly as recited in claim 1, wherein said nacelle is a core nacelle, wherein a fan nacelle is mounted at least partially around said core nacelle and defines an outer boundary of the fan bypass flow path.

3. The assembly as recited in claim 1, further comprising a controller in communication with the fan variable area nozzle to independently position each of said plurality of inserts in response to a flight condition.

4. The assembly as recited in claim 1, wherein the plurality of inserts are configured to be asymmetrically deployed relative to one another to vector a fan thrust.

5. The assembly as recited in claim 1, wherein said plurality of inserts are operable to provide at least an approximately 20% (twenty percent) effective change in the fan nozzle exit area.

6. The assembly as recited in claim 1, wherein said plurality of inserts move axi-symmetrically such that the plurality of inserts move uniformly.

7. The assembly as recited in claim 1, wherein said independently moveable plurality of inserts are arranged to provide trim balance.

8. The assembly as recited in claim 1, wherein said independently moveable plurality of inserts are arranged to provide enhanced ground operations.

9. A nacelle assembly for a gas turbine engine comprising:
   a nacelle defined about an axis and defining a boundary of a fan bypass flow path; and
   a fan variable area nozzle including a plurality of inserts movably mounted to said nacelle, each of said plurality of inserts are adjacent said nacelle and extend therefrom, wherein said plurality of inserts are each independently moveable into the fan bypass flow path relative said nacelle to selectively vary a fan nozzle exit area, wherein said plurality of inserts arranged in a stowed position define at least a portion of a radial inner boundary of the fan bypass flow path, wherein said plurality of inserts are moveable axially aft to reach a deployed position, wherein said plurality of inserts are axially forward of the aft end of the fan nozzle exit area, wherein said plurality of inserts in a deployed position bifurcate said fan bypass flow path into a radially inner flow path and a radially outer flow path.

10. The assembly as recited in claim 9, wherein said nacelle is a core nacelle, wherein a fan nacelle is mounted at least partially around said core nacelle and defines an outer boundary of the fan bypass flow path.

11. The assembly as recited in claim 9, further comprising a controller in communication with the fan variable area nozzle to independently position each of said plurality of inserts in response to a flight condition.

12. The assembly as recited in claim 9, wherein at least one the plurality of inserts are configured to be asymmetrically deployed relative another of the plurality of inserts to vector a fan thrust.

13. The assembly as recited in claim 9, wherein said plurality of inserts are operable to provide at least an approximately 20% (twenty percent) effective change in the fan nozzle exit area.

14. The assembly as recited in claim 9, wherein said plurality of inserts move axi-symmetrically such that the plurality of inserts move uniformly.

15. The assembly as recited in claim 9, wherein said plurality of inserts are moveably mounted to the nacelle by a linkage.

16. The assembly as recited in claim 9, wherein said plurality of inserts are operable to provide an approximately 20% (twenty percent) effective change in the fan nozzle exit area.

* * * * *

UNITED STATES PATENT AND TRADEMARK OFFICE
CERTIFICATE OF CORRECTION

| | | |
|---|---|---|
| PATENT NO. | : 8,662,417 B2 | Page 1 of 1 |
| APPLICATION NO. | : 13/625343 | |
| DATED | : March 4, 2014 | |
| INVENTOR(S) | : Pero | |

It is certified that error appears in the above-identified patent and that said Letters Patent is hereby corrected as shown below:

ON THE TITLE PAGE:

Item (54), and in the Specification, Column 1, Line 1-3, the title should read as follows:

--GAS TURBINE ENGINE FAN VARIABLE AREA NOZZLE WITH SWIVALABLE INSERT SYSTEM--

Item (63) Related U.S. Application Data should read as follows:

--Continuation of 12/441,607 filed March 17, 2009, now Pat. No. 8,272,202, which is a 371 of PCT/US2006/040249 filed on October 12, 2006--

Signed and Sealed this
Third Day of June, 2014

Michelle K. Lee
*Deputy Director of the United States Patent and Trademark Office*